March 16, 1926.
H. L. ZANDER
PIPE JOINT
Filed April 30, 1925
1,577,090
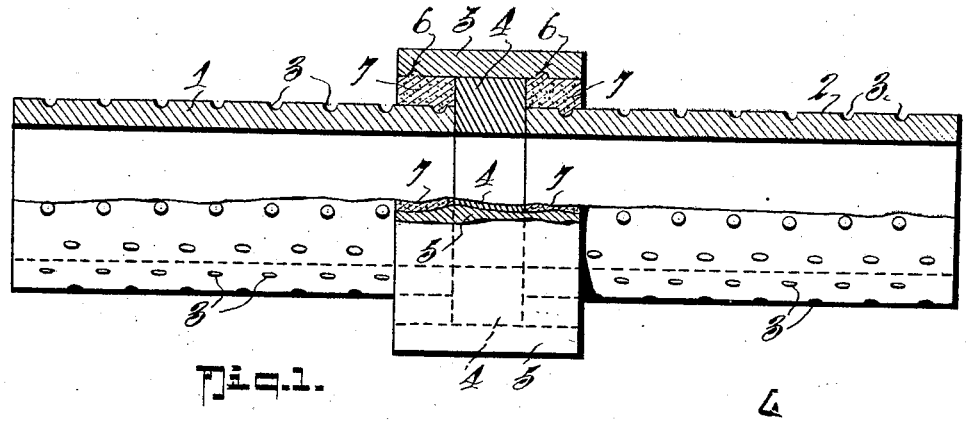
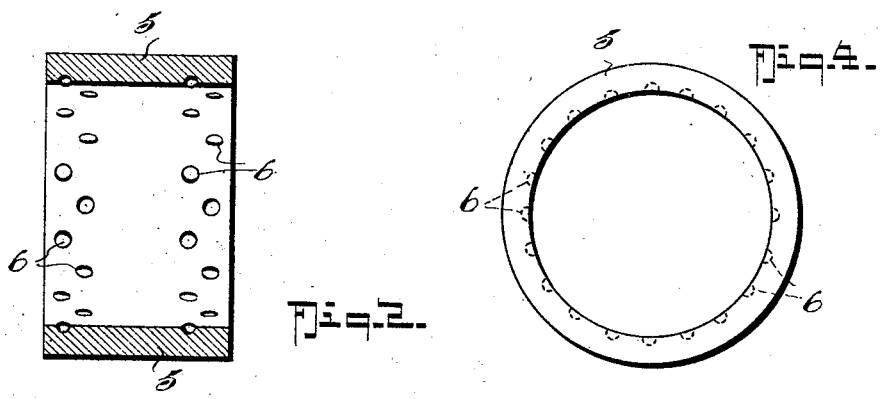
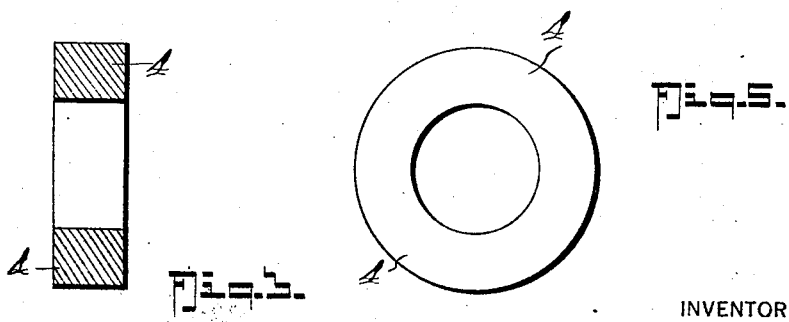
INVENTOR
Henry Louis Zander.
BY
ATTORNEY Patented Mar. 16, 1926.

1,577,090

UNITED STATES PATENT OFFICE.

HENRY LOUIS ZANDER, OF NEW ORLEANS, LOUISIANA.

PIPE JOINT.

Application filed April 30, 1925. Serial No. 27,016.

*To all whom it may concern:*

Be it known that I, HENRY LOUIS ZANDER, a citizen of the United States, residing at New Orleans, in the parish of Orleans and State of Louisiana, have invented a new and Improved Pipe Joint, of which the following is a specification.

The invention generally relates to pipe joints and has for its object to provide a simple joint structure, economical to manufacture, and efficiently operable for its intended purpose of providing a properly sealed pipe juncture, and in which the constituent parts are so formed that their maximum strength is maintained and not made subject to ready breakage due to weakened portions occasioned by provision of grooves and the like now common in the art.

The invention further has for its object to provide a pipe joint in which the desired function is obtained without the use of belled and flanged ends, the latter being objectionable because of waste of material, shipping and storing space, and the difficulty occasioned in trying to lay them evenly and in perfect alignment.

With the above and other objects in view that will hereinafter appear, the invention still further resides in the novel details of construction, combination and arrangement of parts, all of which will be first fully described, then be particularly pointed out in the appended claim and illustrated in the drawings, in which:—

Figure 1 is a side elevation and part section of a pipe joint embodying my invention.

Figure 2 is a cross section of the sleeve forming part of the joint.

Figure 3 is a cross section of the joint gasket.

Figures 4 and 5 are edge views of the sleeve and gasket respectively.

In the drawings, 1 and 2 indicate pipe sections constructed in accordance with my invention and joined by the joint which forms a part of that invention.

The pipe lengths may be constructed of metal, clay, vitrified or glazed, plain or reinforced concrete and have their external surfaces provided with alternately positioned annular rows of shallow semi-spherical depressions 3.

It will be observed that the pipe sections are made cylindrical throughout their length, without bell-flanged ends or any enlargements whatever such as render difficult perfect alignment in the laying, and occasion great waste of space in shipping and storing pipe lengths so equipped.

Also, by reason of the nature of my improved joint, while it is desired that all pipe sections be constructed as hereinbefore described, plain pipe sections not having the depressions 3 may be spliced in with such other sections, the sections constructed in accordance with the invention and abutting the said plain section serving to provide the desired interlocking and sealing means.

In forming the joint the adjacent ends of the pipes 1 and 2 are caused to abut a joiner gasket 4 of soft metal or other suitable material, the inside diameter of which is the same as that of the pipes and the outside diameter thereof being such that it will project appreciably beyond the outside diameter of said pipes.

A joiner sleeve 5 is provided and is constructed of a diameter for fitting over the gasket 4, so that, when positioned over said gasket with the said gasket centrally positioned therein, an annular seal receiving pocket is provided at each side of said gasket.

That portion of the internal surface of the sleeve 5 adapted to lie to each side of the gasket 4 is provided with two or more staggered rows of shallow semi-spherical depressions 6.

When the pipe ends, gasket and sleeve are brought into cooperative relation the annular pockets formed at each side of the gasket between sleeve ends and pipes are filled with a sealing filler 7 of soft metal or other suitable sealing packing.

The packing 7 will be forced into the depressions 3 and 6 of pipe ends and sleeve and act as anti-displacement mediums.

By forming the pipe lengths with depressions 3 throughout its length provision is made whereby the pipes may be cut up into any length necessary with like effect.

Also, by reason of the special pipe construction and that of gasket and sleeve, when necessary, a plain pipe length may be spliced between two depression-provided pipes with the internal depressions of the sleeve 5 and those of the depression-provided pipe ends serving to supply the deficiency of the plain surfaced pipe that would otherwise exist.

In the foregoing description I have disclosed a simple pipe joint structure that can be more cheaply and easily manufactured than those now commonly used, the parts of which may be conveniently laid in alignment, may be stored and shipped without needless waste of space, and which when assembled provide a more efficient and desirable joint than those now in common use.

What I claim is:

A device of the class described comprising a gasket, hollow pipe sections abutting the gasket and having staggered shallow depressions in the outer surfaces thereof, the said gasket having a central bore in alignment with the hollows of the pipe sections and being of a diameter for extending beyond the outer surfaces of the pipe sections, a sleeve adapted to fit over the gasket and extend appreciably beyond the sides thereof to provide annular pockets surrounding the pipe ends and having shallow depressions in the inner surface thereof at each side of the position of the gasket, and sealing packing in the annular pockets and extending into the surrounding depressions of pipe ends and sleeve.

HENRY LOUIS ZANDER.